No. 629,105. Patented July 18, 1899.
J. J. FITZGERALD.
MEAT TREE OR HANGER FOR MEAT.
(Application filed Apr. 23, 1898.)
(No Model.)

Witnesses
N. T. Collamer
Geo. E. Frech

Inventor
John J. Fitzgerald
By Chas. C. Tillman
Attorney

UNITED STATES PATENT OFFICE.

JOHN J. FITZGERALD, OF CHICAGO, ILLINOIS, ASSIGNOR TO THE FITZGERALD MEAT TREE COMPANY, OF SAME PLACE.

MEAT TREE OR HANGER FOR MEAT.

SPECIFICATION forming part of Letters Patent No. 629,105, dated July 18, 1899.

Application filed April 23, 1898. Serial No. 678,543. (No model.)

*To all whom it may concern:*

Be it known that I, JOHN J. FITZGERALD, a citizen of the United States, residing at Chicago, in the county of Cook and State of Illinois, have invented certain new and useful Improvements in Meat Trees or Hangers for Meat, of which the following is a specification.

It is the object of my present invention to afford a means for hanging and transporting a number of pieces of meat at one time and in which the transfer of the loaded tree or hanger from one building to another may be easily and quickly accomplished, thus preventing the loss of time in emptying one building before it can be refilled.

Another object of my invention is to provide a meat tree or hanger in which the pieces of meat will be held in such a manner as to be separated one from another or out of touch, thus exposing the entire surface of each piece, and thereby enabling it to be more thoroughly smoked or chilled.

With these and other objects, to be hereinafter mentioned, in view my invention consists in certain peculiarities of the construction, novel arrangement, and operation of the various parts thereof, as will be hereinafter more fully set forth and specifically claimed.

In order to enable others skilled in the art to which my invention pertains to make and use the same, I will now proceed to describe it, referring to the accompanying drawings, in which—

Figure 1:
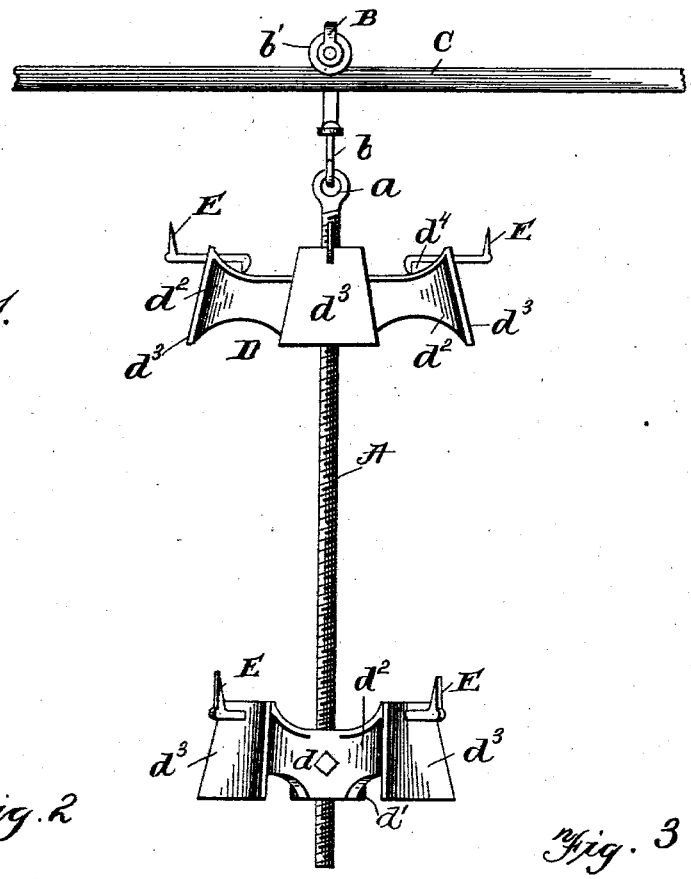
Figure 2:
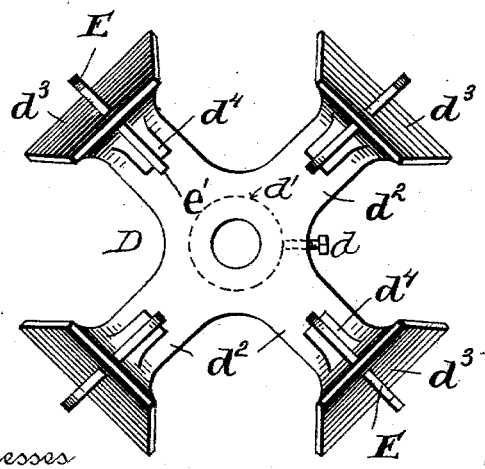
Figure 3:
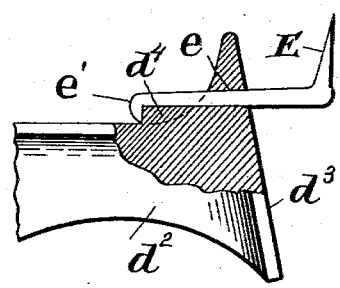

Figure 1 is a view in side elevation of a meat tree or hanger, showing it movably mounted on a rail, which rail may lead from the curing-room to the smoke-house or from the latter to the packing room or floor. Fig. 2 is an enlarged view, partly in section and partly in elevation, of a portion of one of the supporting-racks. Fig. 3 is a plan view of a like part.

Similar letters refer to like parts throughout the different views of the drawings.

A represents the supporting-body, which is preferably a rod or bar having at its upper end a ring or opening $a$ to engage a hook $b$, swiveled in the lower end of the bracket B, in the upper portion of which is journaled a roller $b'$, which travels on a rail C, which, as before stated, may lead from the curing-room to the smoke-house and from the smoke-house to the packing room or floor. Secured on the rod or bar A, and at proper points thereon, are a number of meat-supporting racks D, each of which is provided with a hub having a central opening for the reception of the rod or bar, and is held in position thereon by means of a set-screw $d$, having its seat in the body $d'$ of the rack. Each of the racks is provided with radial arms $d^2$, usually four in number, and having at their outer ends flattened and inclined portions $d^3$, through the upper portion of each of which is an opening $e$ for the reception of the hook E, which has its outer end rising above the face of the arm and its inner end bent downwardly, as at $e'$, to engage the shoulder $d^4$ on the upper surface of the arms of the rack and prevent the hook becoming displaced.

The construction shown in the drawings is more especially designed for hanging hams, shoulders, and what are known as "California hams."

It is evident that any desired number of the meat-supporting racks may be secured on the supporting-rods and at proper points thereon, and it is apparent that when the racks of the form shown in Fig. 1 are used they may be so placed on the supporting bar or rod that the hooks E on each alternate rack will be located so as to be on a vertical line between the arms $d^2$ of the adjacent racks, thus allowing the racks to be placed closer together and yet preventing the pieces of meat from touching each other.

It is evident by using my trees or hangers that a large number of pieces of meat may be transferred on the rails C from the curing-room to the smoke-house and there left to remain until properly smoked, when they may be readily and quickly removed on similar rails to the packing-room or floor, thus permitting the smoke-house to be replenished without loss of time and without injury to the meat.

The ends or flat portions of the arms $d^2$ of the racks D form rests against which the upper ends of the pieces of meat stand; but by being inclined outwardly at their lower ends it is obvious that the pieces of meat suspended on the hooks E will rest against said inclined parts, and thereby have their lower ends more widely separated than their upper portions, which will permit the cold air to come in contact with their entire surfaces. This construction is especially advantageous in hanging hams, shoulders, and California hams, as their lower portions are thicker than their upper parts, and if they were allowed to hang vertically it is apparent that they would contact with each other at their lower portions.

The supporting bars or rods A may be screw-threaded, as shown in Fig. 1, to engage screw-threaded openings in the meat-supporting racks, in which construction the set-screws may be dispensed with, if desired.

Having thus fully described my invention, what I claim as new, and desire to secure by Letters Patent, is—

1. In a meat tree or hanger, the combination with an upright supporting rod or bar, and means for sustaining it; of a series of meat-supporting racks, each comprising a central portion or hub surrounding said bar, means for adjustably securing it thereto, horizontally-disposed extensions or arms projecting from said hubs and having their outer extremities flattened and inclined downwardly and outwardly, and means near the upper ends of said flattened extremities for sustaining the meat, all as and for the purpose set forth.

2. In a meat tree or hanger, the combination with an upright supporting rod or bar, and means for sustaining it; of a series of meat-supporting racks each secured to said bar and having radially-disposed extensions or arms with flattened outer extremities inclined downwardly and outwardly, the extremities of one set of arms standing over and between those of the set next below, and means near the upper ends of said flattened extremities for sustaining the meat, as and for the purpose set forth.

3. In a meat tree or hanger, the combination with an upright supporting rod or bar; of a rack comprising a hub attached to said bar and having radial arms with flattened outer ends and shoulders on their upper sides, and hooks with their bodies extending through said flattened ends, their outer pointed extremities turned upward, and their inner ends turned downward behind said shoulders, all as and for the purpose set forth.

4. In a meat tree or hanger, the combination with a support; of a rack comprising a hub connected with said support and having radial arms each having a flattened outer end inclined downwardly and outwardly and provided with an opening therethrough above the arm proper, and a hook whose body extends through said opening, whose outer extremity is pointed and turned upward, and whose inner end is engaged with said arm, as and for the purpose set forth.

Chicago, Illinois, April 20, 1898.

JOHN J. FITZGERALD.

Witnesses:
CHAS. C. TILLMAN,
E. A. DUGGAN.